Aug. 24, 1937.　　　　D. D. PEEBLES　　　　2,090,984
DEHYDRATING APPARATUS AND METHOD
Filed Oct. 19, 1934　　　3 Sheets-Sheet 1
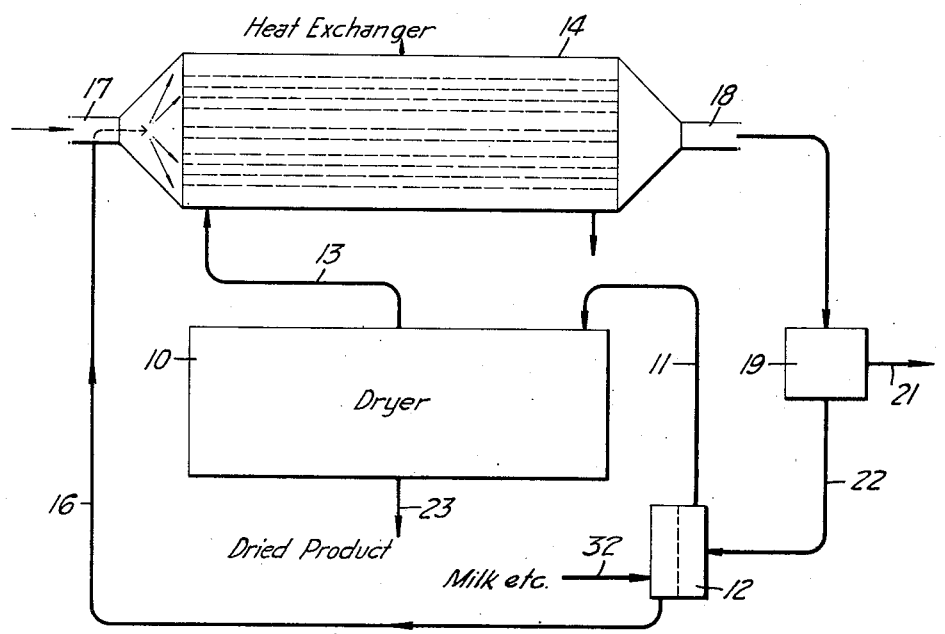
FIG_1_
FIG_4_
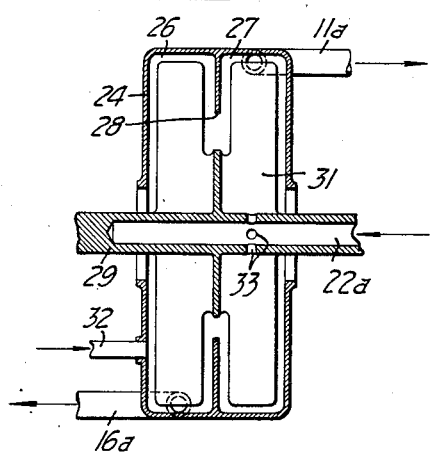
INVENTOR
David D. Peebles
BY
Paul D. Flehr
ATTORNEY Aug. 24, 1937.  D. D. PEEBLES  2,090,984
DEHYDRATING APPARATUS AND METHOD
Filed Oct. 19, 1934   3 Sheets-Sheet 2
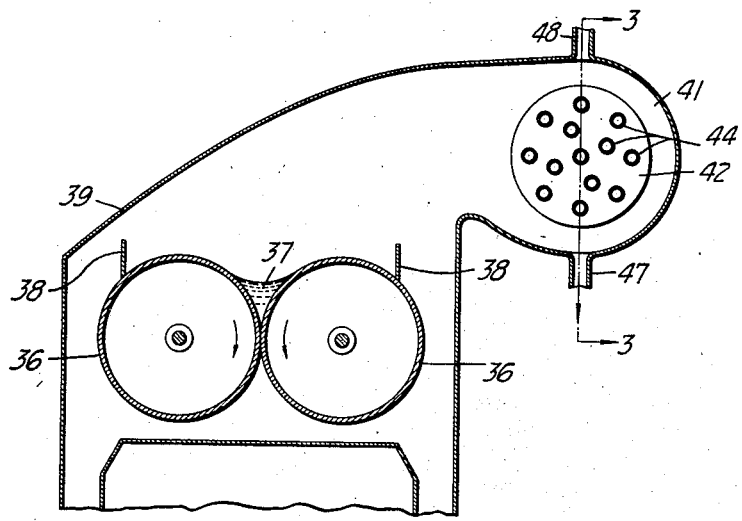
FIG_2_
FIG_3_
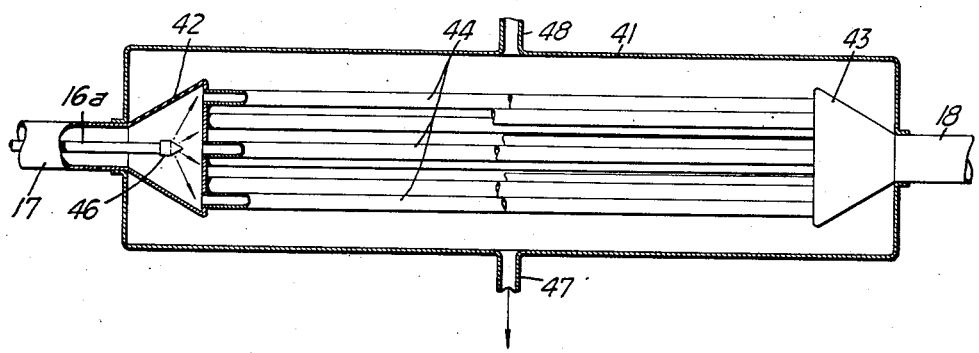
INVENTOR
David D. Peebles
BY
ATTORNEY

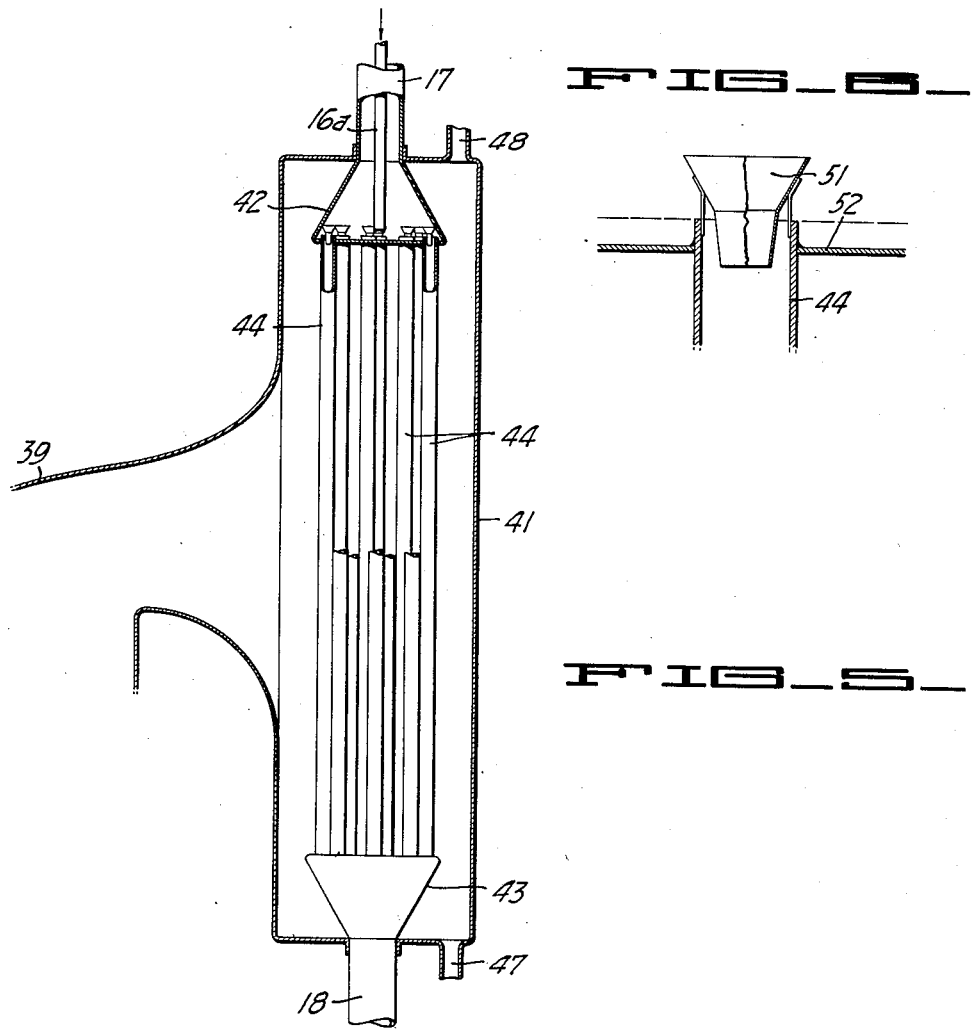

Patented Aug. 24, 1937

2,090,984

UNITED STATES PATENT OFFICE 2,090,984

DEHYDRATING APPARATUS AND METHOD

David D. Peebles, Eureka, Calif.

Application October 19, 1934, Serial No. 749,077

3 Claims. (Cl. 159—16)

This invention relates generally to methods and apparatus for the dehydration or drying of solid-containing liquid materials. It has particular application where apparatus is utilized which contacts a film of the liquid material with a heated surface, as for example, dryers of the drum type.

It is a general object of the invention to improve upon the efficiency and economy of methods and apparatus of the above character, thus making possible relatively high drying capacity for a given amount of plant equipment.

It is a further object of the invention to make possible the utilization of heat contained in the vapors evolved from certain types of dryers, particularly dryers of the drum type, where the utilization of such heat has previously been consider impractical or impossible.

Further objects of the invention will appear from the following description in which the preferred embodiment of the invention has been set forth in detail in conjunction with the accompanying drawings.

Referring to the drawings:

Figure 1 is a diagrammatic view illustrating an arrangement of apparatus for carrying out the present invention.

Figure 2 is a cross-sectional detail, illustrating a suitable heat exchanger in conjunction with a dryer of the drum type.

Figure 3 is a cross-sectional detail taken along the line 3—3 of Figure 2.

Figure 4 is a side elevational view in cross-section, illustrating a type of defoaming apparatus which I prefer to employ.

Figure 5 is a side elevational view, in cross-section, showing a modified form of heat exchanger.

Figure 6 is a cross-sectional detail, showing the manner in which liquid is admitted to the transfer tubes of Figure 5.

The method involved in the present invention can best be understood after a description of the apparatus illustrated in the drawings. Referring to Figure 1, the apparatus includes a dryer 10 to which liquid feed is being supplied by way of line 11. Immediately before the feed is supplied to the dryer, it is preferably passed through apparatus 12, of a type to be presently described in detail. Steam or water vapor being evolved within the dryer 10 is being shown collected by way of line 13 and introduced into the heat exchanger 14. The heat exchanger is preferably of a type to be presently described in detail, it being sufficient to point out at present that a suitable gas such as air is caused to flow through the heat exchanger with considerable velocity, and that liquid to which heat is to be imparted is sprayed into the heat exchanger. Thus, line 16 represents introduction of liquid feed from the apparatus 12 to the heat exchanger 14. Gas such as air is caused to flow into the heat exchanger through conduit 17, and is removed by way of conduit 18. The discharge through conduit 18 is delivered to a trap or separator 19 from which air and gaseous phase components are discharged by way of line 21, and liquid phase components delivered by line 22 to the apparatus 12.

Referring now to Figure 4, a desirable form of apparatus 12 consists of a hollow housing 24, the interior of which is divided into a pair of annular chambers 26 and 27 by the intermediate annular baffle 28. Disposed within the housing, and mounted upon a hollow rotatable shaft 29, there is an impeller 31. The vanes of this impeller extend into the chambers 26 and 27, whereby liquid material contained therein is caused to swirl about upon rotation of the shaft 29. Liquid feed material, such as raw milk, can be supplied to chamber 26 through pipe 32, preferably by gravity from a source of constant head. From chamber 26 liquid can be discharged under pressure from pipe 16a, and can flow over the annular wier afforded by baffle 28 to chamber 27. Additional or returned liquid can also be introduced into chamber 27 through passage 22a and ports 33 in shaft 29. From chamber 27 liquid can discharge under pressure through pipe 11a.

With respect to the mode of operation of the apparatus 12 described above, liquid feed material is supplied through pipe 32, and, with a proper rate of feed with respect to the discharge through pipe 16a, a rotating mass of liquid will be maintained in chamber 26. Liquid supplied to chamber 26 in excess of that delivered from pipe 16a flows over baffle 28 to chamber 27. If the depth of liquid in both chambers 26 and 27 is such as to cover the opening to pipe 32, inflow of feed liquid will be decreased in accordance with the back pressure thus developed. Therefore, with respect to the feeding of liquid through pipe 32, the apparatus serves as an automatic regulator, and at the same time the liquid may be defoamed, in accordance with the disclosure of my co-pending application Serial No. 690,106, filed September 19, 1933. Liquid supplied to chamber 27, which may consist of liquid introduced through shaft 29 and also of liquid flowing over baffle 28, is likewise defoamed before being delivered through pipe 11a.

Figures 2 and 3 illustrate a desirable form of heat exchanger, and Figure 2 illustrates also the relationship of such an exchanger with a dryer of the drum type. In accordance with conventional practice, such a dryer consists of a pair of cylindrical rolls 36 mounted side by side upon horizontal axles, and adapted to rotate slowly in opposite directions. The walls of these drums are heated to an elevated temperature by means of steam introduced into the interior of the same. Near the ends of the drums retaining walls are provided, so that liquid can be fed to the trough between the drums to form a pool 37. Generally, the supply of liquid to this pool, represented in Figure 1 as being by way of pipe 11, is controlled by a suitable valve which in turn is actuated by a float. As the drums rotate in opposite directions in the manner indicated in Figure 2, their external surfaces become coated with the liquid and, before one revolution has been completed, sufficient moisture has been driven off to leave the solid components in dried or semi-dried condition. These solid components are continuously removed by suitable means, such as scrapers 38.

The dryer described above is provided with a suitable enclosure 39 to substantially exclude the atmosphere and to collect evolved steam or water vapor. An extension 41 of this enclosure causes the vapor to envelop certain parts of the heat exchanger, as shown in Figure 3. Briefly, this heat exchanger consists of a pair of headers 42 and 43 which are interconnected by the elongated heat exchange tubes 44. Within the header 42 there is a spray head 46 which is connected with the liquid supply pipe 16a. Header 42 also connects with the gas inflow conduit 17, while header 43 communicates with the outflow conduit 18. Assuming that a proper draft of a suitable gas such as air is maintained through the heat exchanger, either by blowing air into conduit 17 or by applying the suction of a fan or blower to the conduit 18, a relatively high velocity of air flow is maintained through the heat exchange tubes 44. Such a high velocity flow through these elongated tubes or passageways causes a condition of turbulence, due to skin friction with respect to the inner side walls of the tubes. Liquid material introduced into the header 44 is entrained by the air flow, and when the liquid particles are carried into tubes 44 the condition of turbulence causes them to be brought into contact with the side walls of the tubes. Such a condition is highly effective in causing heat imparted to the side walls of the tubes to be taken up by the liquid, with the result that a certain amount of the water is vaporized and the liquid feed is concentrated. The continual wetting of the inner walls of the tubes likewise prevents incrustation or growth of solid material upon the walls of the tubes. The discharge from conduit 18 therefore consists of air together with water vapor and concentrated liquid material. Condensate, collecting within the extension 41, can be drained away by suitable means, such as pipe 47. Air or other non-condensable constituents can also be removed by way of pipe 48.

Operation of the apparatus shown in Figure 1, and the method involved in the present invention, can now be briefly reviewed as follows:—In order to present a typical example, it will be presumed that the liquid material to be desiccated consists of raw milk or a milk product, particularly since the invention has been found of practical value for this purpose. Raw milk is supplied to the apparatus 12 through line 32, under a head which is controllable by the head which is built up in chamber 26, as for example a gravity flow head of given height. The milk is then supplied to the heat exchanger 14 through line 16. Within the heat exchanger sensible heat is imparted to the liquid and a certain amount of the moisture is evolved. From trap 19, air and vapors are discharged by way of line 21, while the collected liquid, which has been somewhat concentrated and which may be more or less foamed, is again delivered to apparatus 12 by way of line 22. Within apparatus 12 the concentrated liquid is defoamed and then delivered through line 11 to the dryer 10. Any excess milk flowing into chamber 26 flows over the baffle 28 for recirculation. Solid material is removed from the dryer as indicated by line 23. Apparatus 12 preferably not only defoams the concentrated liquid before delivery to the dryer, but also serves to automatically regulate the supply of liquid fed to the system, in accordance with the capacity of the dryer. The air or like gas supplied to the heat exchanger may be air from the atmosphere, or, if desired, air or gas heated somewhat above atmospheric temperature may be utilized, as for example waste flue gases which may be available.

A modified form of heat exchanger is shown in Figures 5 and 6. In this case the tubes are arranged vertically and the vapors are supplied to one side of the enclosure 41a. The upper ends of tubes 44 are sealed with respect to a tube plate 51, and each tube receives a stream of liquid introduced into header 42 through pipe 16a. Funnel like members 52 can be positioned with the open inlet end of each tube 44 in order to insure flow of air or like gas into each of the tubes. Within each of the tubes 44 there is sufficient turbulent gas flow to break up the liquid into droplets, thus securing substantially the same effect as with the apparatus of Figures 2 and 3. If desired the members 51 can be omitted, in which event however it is desirable to spray the liquid into header 42, as has been described with reference to Fig. 3.

The apparatus and method decribed above make possible material economy in the drying or desiccation of solid containing liquid feed material. For example, with a given amount of plant equipment in the form of drum dryers, a substantial increase in drying capacity is made possible without the use of additional boiler capacity.

I claim:

1. In a method of the character described for the drying of solid-containing liquids, causing the liquid to be entrained in a turbulent flow of gas, effecting a heat transfer to the liquid while being so treated, segregating liquid material from the gas flow; defoaming the segregated liquid, subjecting the segregated liquid to evaporation whereby water vapor is evolved, and utilizing latent heat of evaporation of said evolved vapors to supply heat to the liquid while entrained in said turbulent flow.

2. In apparatus of the character described, means forming an elongated passageway having heat conducting walls, means for causing a flow of gas through said passageway at sufficient velocity to cause turbulence, means for introducing solid-containing liquid feed into said passageway, means for collecting liquid phase material discharged from said passageway, means for defoaming said collected liquid material, a drum dryer for drying the defoamed material whereby water vapor is evolved, and means serving to utilize latent heat of evaporation of said vapor for transmitting heat through the walls of said passageway.

3. In a method for the drying of solid-containing liquids, causing droplets of the liquid to be entrained in a turbulent flow of substantially noncondensible gas, effecting indirect transfer of heat to the entrained liquid, substantially completely separating the liquid from the carrier gas, subjecting the separated liquid to further evaporation, and supplying the heat transferred to the entrained liquid in the first-mentioned step solely by the vapor evolved from the liquid in the last-mentioned step.

DAVID D. PEEBLES.